(12) United States Patent
Murata

(10) Patent No.: US 8,480,273 B2
(45) Date of Patent: Jul. 9, 2013

(54) POSITIONING STRUCTURE OF TURN LAMP ASSEMBLY IN OUTER MIRROR WITH TURN LAMP

(75) Inventor: Yoshihiro Murata, Fujieda (JP)

(73) Assignee: Murakami Corporation, Shizuoka (JP)

( * ) Notice: Subject to any disclaimer, the term of this patent is extended or adjusted under 35 U.S.C. 154(b) by 422 days.

(21) Appl. No.: 12/831,346

(22) Filed: Jul. 7, 2010

(65) Prior Publication Data

US 2011/0051450 A1 Mar. 3, 2011

(30) Foreign Application Priority Data

Aug. 31, 2009 (JP) ................................. 2009-200841

(51) Int. Cl.
*B60Q 1/26* (2006.01)
*B60Q 1/00* (2006.01)

(52) U.S. Cl.
USPC .......................................... 362/540; 362/549

(58) Field of Classification Search
USPC ........................... 362/487, 494, 540, 546–549
See application file for complete search history.

(56) References Cited

U.S. PATENT DOCUMENTS

| | | | | |
|---|---|---|---|---|
| 6,120,170 | A * | 9/2000 | Hamelbeck | 362/549 |
| 7,104,662 | B2 | 9/2006 | Kawanishi | |
| 7,758,010 | B2 | 7/2010 | Tanaka | |
| 2005/0254153 | A1 * | 11/2005 | Kawanishi | 359/879 |
| 2007/0201153 | A1 | 8/2007 | Tanaka | |

FOREIGN PATENT DOCUMENTS

| | | |
|---|---|---|
| JP | 11-48856 | 2/1999 |
| JP | 2002-337606 | 11/2002 |
| JP | 2005-319906 | 11/2005 |
| JP | 2005-349848 | 12/2005 |
| JP | 2006-290184 | 10/2006 |
| JP | 2007-137125 | 6/2007 |
| JP | 2009-46037 | 3/2009 |

OTHER PUBLICATIONS

U.S. Appl. No. 12/831,356 to Yoshihiro Murata, filed Jul. 7, 2010.
Japan Office action, dated Apr. 9, 2013 along with an english translation thereof.
Notification, dated Jan. 17, 2012.
Submission of Publication, dated Dec. 9, 2011.

* cited by examiner

*Primary Examiner* — Karabi Guharay
*Assistant Examiner* — Nathaniel Lee
(74) *Attorney, Agent, or Firm* — Greenblum & Bernstein, P.L.C.

(57) ABSTRACT

In an outer mirror with turn lamp having a structure in which a turn lamp assembly is mounted to a mirror housing, then a housing cover is placed over and mounted to the mirror housing, and a lens of the turn lamp assembly is exposed through an opening in the housing cover, misalignment between the lens of the turn lamp assembly and the opening in the housing cover is prevented. A protrusion is formed on a back surface near the innermost part of an opening in a housing cover. A hole is formed in the turn lamp assembly in a position facing the protrusion with the housing cover being placed over the mirror housing. When the housing cover is placed over the mirror housing, the protrusion is inserted into and engaged with the hole. This prevents misalignment between the lens of the turn lamp assembly and the opening in the housing cover.

16 Claims, 5 Drawing Sheets

POSITIONING STRUCTURE OF TURN LAMP ASSEMBLY IN OUTER MIRROR WITH TURN LAMP

The disclosure of Japanese Patent Application No. JP2009-200841 filed on Aug. 31, 2009 including the specification, drawings, claims and abstract is incorporated herein by reference in its entirety.

BACKGROUND OF THE INVENTION

1. Field of the Invention

The present invention relates to a positioning structure of a turn lamp assembly in an outer mirror with turn lamp having a structure in which a turn lamp assembly is mounted to a mirror housing and/or a frame mounted to the mirror housing, then a housing cover is placed over and mounted to the mirror housing, and a lens of the turn lamp assembly is exposed through an opening in the housing cover, which prevents misalignment between the lens of the turn lamp assembly and the opening in the housing cover.

2. Description of the Related Art

A conventional outer mirror with turn lamp is described in Japanese Patent Laid-Open No. 2005-319906. This outer mirror is such that a turn lamp assembly (side turn signal lamp) (6) is mounted to a mirror housing (4), then a housing cover (garnish) (5) is placed over and mounted to the mirror housing (4), and a lens (lamp lens) (12) of the turn lamp assembly (6) is exposed through an opening in the housing cover (5) (reference numerals in parenthesis are used in Japanese Patent Laid-Open No. 2005-319906).

In the outer mirror with turn lamp described in Japanese Patent Laid-Open No. 2005-319906, the turn lamp assembly (6) is secured to the mirror housing (4) and not secured to the housing cover (5). Thus, with the housing cover (5) being placed over and mounted to the mirror housing (4), alignment between an opening end (innermost part of the opening) (a position on the side close to a vehicle body) of the housing cover (5) and the lens (12) of the turn lamp assembly is difficult, and therefore misalignment easily occurs therebetween when the housing cover is distorted. In particular, when the opening end of the housing cover (5) and a lens end housed and placed in the opening end are tapered, misalignment therebetween noticeably occurs.

The present invention is achieved in view of the above-described points, and has an object to provide a positioning structure of a turn lamp assembly in an outer mirror with turn lamp having a structure in which a turn lamp assembly is mounted to a mirror housing and/or a frame mounted to the mirror housing, then a housing cover is placed over and mounted to the mirror housing, and a lens of the turn lamp assembly is exposed through an opening in the housing cover, which prevents misalignment between the lens of the turn lamp assembly and the opening in the housing cover.

SUMMARY OF THE INVENTION

The present invention provides a positioning structure of a turn lamp assembly in an outer mirror with turn lamp having a structure in which a turn lamp assembly is mounted to a mirror housing or a frame mounted to the mirror housing or the mirror housing and the frame, then a housing cover is placed over and mounted to the mirror housing, and a lens of the turn lamp assembly is exposed through an opening in the housing cover, including: a protrusion or a recess (or alternatively a hole) formed in a peripheral edge of the opening in a back surface of the housing cover; and a recess (or alternatively a hole) or a protrusion that is formed in the turn lamp assembly and engages the protrusion or the recess (or alternatively the hole) of the housing cover when the housing cover is placed over the mirror housing mounted with the turn lamp assembly. According to the present invention, the protrusion or the recess (or alternatively the hole) of the housing cover is inserted into and engaged with the recess (or alternatively the hole) or the protrusion of the turn lamp assembly when the housing cover is placed over the mirror housing, thereby preventing misalignment between the lens of the turn lamp assembly and the opening in the housing cover and preventing worsened appearance.

In the present invention, the recess (or alternatively the hole) or the protrusion of the turn lamp assembly may be formed in a position closer to a vehicle body than a securing position of the turn lamp assembly to the mirror housing or the frame or the mirror housing and the frame. This can prevent misalignment between the lens of the turn lamp assembly and the opening in the housing cover particularly in the position on the side close to the vehicle body.

In the present invention, the recess (or alternatively the hole) or the protrusion of the turn lamp assembly may be formed in a position on the side close to the vehicle body in a longitudinal direction of the turn lamp assembly (for example, a position closer to the vehicle body than a position at one half of the entire length in the longitudinal direction, or than a position at one third of the entire length in the longitudinal direction from the vehicle body side). In general, misalignment between the lens of the turn lamp assembly and the opening in the housing cover noticeably occurs in the position on the side close to the vehicle body in the longitudinal direction of the turn lamp assembly. In contrast, according to the configuration stated above, since the recess (or alternatively the hole) or the protrusion of the turn lamp assembly is formed in the position stated above, the misalignment between the lens and the opening in the housing cover in the position can be prevented. In particular, in an embodiment described later, the recess (or alternatively the hole) or the protrusion of the turn lamp assembly is formed as a protruding piece formed to protrude closer to the vehicle body than an end of the lens of the turn lamp assembly exposed on the side close to the vehicle body. In general, the misalignment between the lens of the turn lamp assembly and the opening in the housing cover particularly noticeably occurs in the end position of the lens of the turn lamp assembly exposed on the side close to the vehicle body. In contrast, according to the configuration stated above, since the recess (or alternatively the hole) or the protrusion of the turn lamp assembly is formed in the position closer to the vehicle body than the end position of the lens of the lamp assembly, the end position of the lens exposed on the side close to the vehicle body can be accurately positioned and therefore the misalignment between the lens and the opening in the housing cover in the end position can be prevented.

In the present invention, the protrusion may be tapered so as to be easily inserted into the facing recess or the facing hole. In the present invention, for example, the protrusion may be constituted by a front cross-shaped rib, and the recess or the hole may be formed into a rectangular shape into which the rib fits. According to this, engagement between the front cross-shaped rib and the recess or the hole allows the lens of the turn lamp assembly and the opening in the housing cover to be positioned both vertically and laterally.

BRIEF DESCRIPTION OF THE DRAWINGS

FIG. 1A is a partial sectional view, and FIG. 1B is a front view showing an engagement state between the protrusion 40 and a positioning hole 30a;

DETAILED DESCRIPTION OF THE PREFERRED EMBODIMENTS

Figure 2:
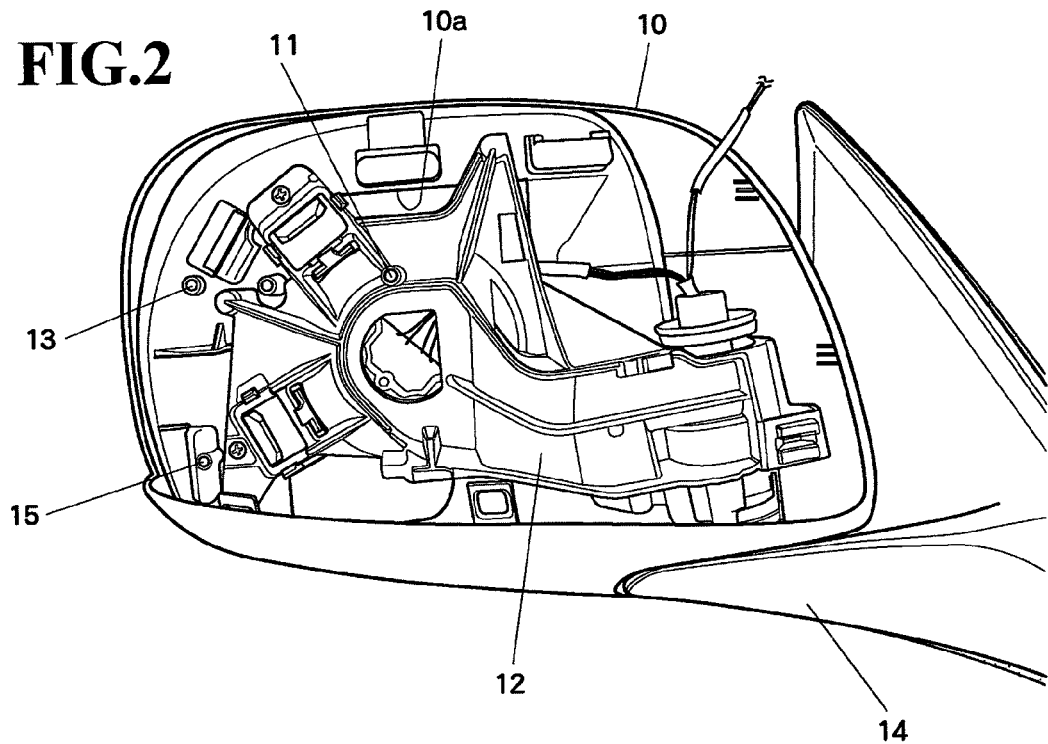
FIG. 2 shows the embodiment of the present invention, and shows a vehicle right side door mirror viewed from a back side of the door mirror with a turn lamp assembly and a housing cover being removed.

An embodiment of the present invention will be described below. FIG. 2 shows a vehicle right side door mirror according to the present invention viewed from a back side of the door mirror with a turn lamp assembly and a housing cover being removed. A frame 12 made of metal or rigid plastic is removably mounted to a back surface of a plastic mirror housing 10 by threading screws from a front side of the mirror housing 10. On the frame 12 and the mirror housing 10, bosses 11, 13 and 15 are formed for supporting and securing a turn lamp assembly (described later). The boss 11 is formed on the frame 12 and the bosses 13 and 15 are formed on the mirror housing 10. Screw holes are formed in top surfaces of the bosses 11, 13 and 15, respectively. A front surface (not shown) of the frame 12 is exposed through an opening 10a formed at a center of the mirror housing 10 to the front side of the mirror housing 10. To the exposed front surface of the frame 12, a mirror surface angle adjusting actuator (not shown) is mounted, and a mirror holder holding a mirror is mounted to the actuator. The mirror housing 10 mounted with the frame 12 is rotatably supported by the mirror base 14. The mirror base 14 is mounted to a vehicle body (right door).

Figure 3:
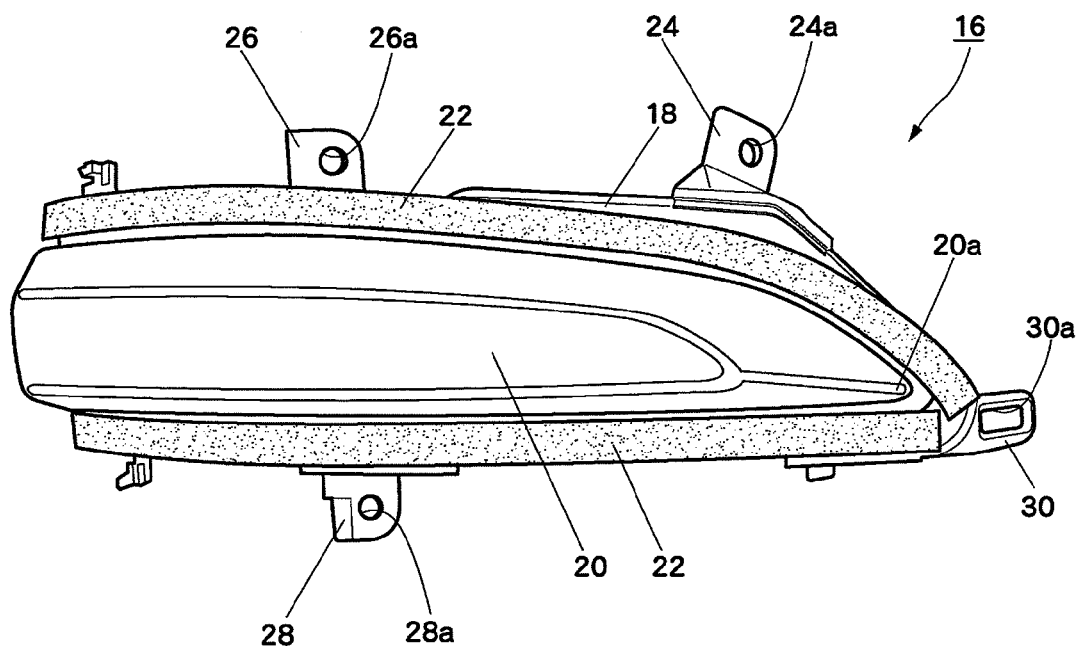
FIG. 3 is a front view showing a turn lamp assembly 16 which is to be assembled to the door mirror in FIG. 2.
Figure 4:
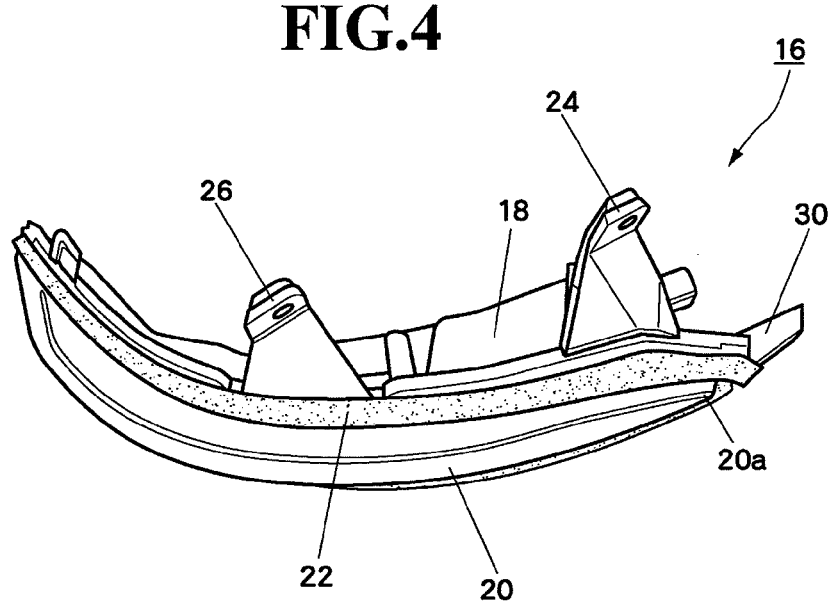
FIG. 4 shows a turn lamp assembly 16 in FIG. 3 viewed from above.

FIGS. 3 and 4 show a turn lamp assembly 16 which is to be assembled to a door mirror half-finished product in FIG. 2. FIG. 3 shows a state viewed from front, and FIG. 4 shows a state viewed from above. The turn lamp assembly 16 has an outer shape curved as shown in FIG. 4 to match a curved outer surface of a housing cover (described later). The turn lamp assembly 16 is configured so that (a) light source(s) such as (an) LED(s) is (are) placed in a plastic lamp housing 18, and a transparent plastic lens 20 closes a front opening in the lamp housing 18. An end 20a of the lens 20 on the side close to the vehicle body is tapered. An end of the lamp housing 18 on the side close to the vehicle body is similarly tapered. An inner surface of the lamp housing 18 constitutes a metal-plated reflecting surface. When an operation to illuminate a turn lamp is performed, the light source(s) is (are) illuminated and the entire reflecting surface glows, and the light is emitted through the lens 20 to the outside. A packing member 22 made of such as sponge is bonded to a periphery of the lens 20 on the front surface of the turn lamp assembly 16. On an outer periphery of the lamp housing 18, screwing mounting pieces 24, 26 and 28 for mounting the turn lamp assembly 16 to the mirror housing 10 mounted with the frame 12 are formed to protrude outward. Screw insertion holes 24a, 26a and 28a are formed in the mounting pieces 24, 26 and 28, respectively. A protruding piece 30 is formed to protrude toward the vehicle body side on an end of the lamp housing 18 on the side close to the vehicle body (a position closer to the vehicle body than the end 20a of the lens 20 on the side close to the vehicle body). In the protruding piece 30, a rectangular positioning hole 30a is formed in a position facing a back surface of the housing cover (described later).

Figure 5:
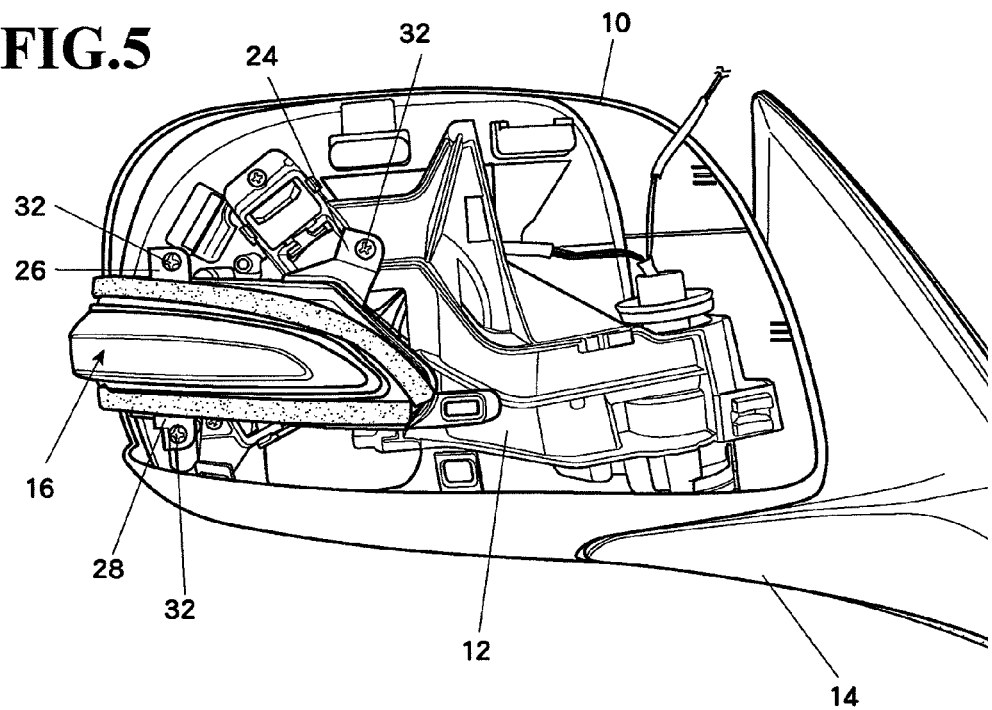
FIG. 5 shows a state where the turn lamp assembly 16 is mounted to a mirror housing 10 mounted with a frame 12 in FIG. 2, viewed from the back side of the door mirror.

FIG. 5 shows a state where the turn lamp assembly 16 is mounted to the mirror housing 10 mounted with the frame 12 in FIG. 2. The turn lamp assembly 16 is removably mounted to the frame 12 and the mirror housing 10 by supporting the mounting pieces 24, 26 and 28 on the bosses 11, 13 and 15 (FIG. 2) on the frame 12 and the mirror housing 10, respectively, inserting screws 32 through the screw insertion holes 24a, 26a and 28a in the mounting pieces 24, 26 and 28, and threading and securing the screws 32 into the screw holes in the bosses 11, 13 and 15.

Figure 6:
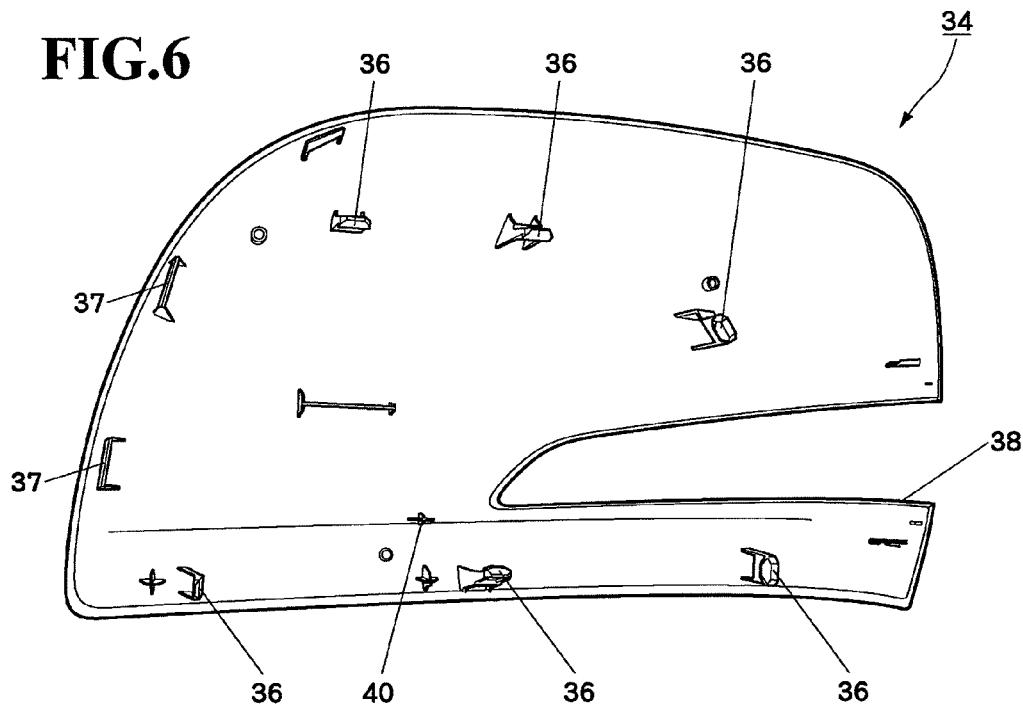
FIG. 6 shows a housing cover 34 which is to be placed over and mounted to the mirror housing 10 mounted with the frame 12 and the turn lamp assembly 16 in FIG. 5, viewed from a back side of the housing cover 34.
Figure 7:
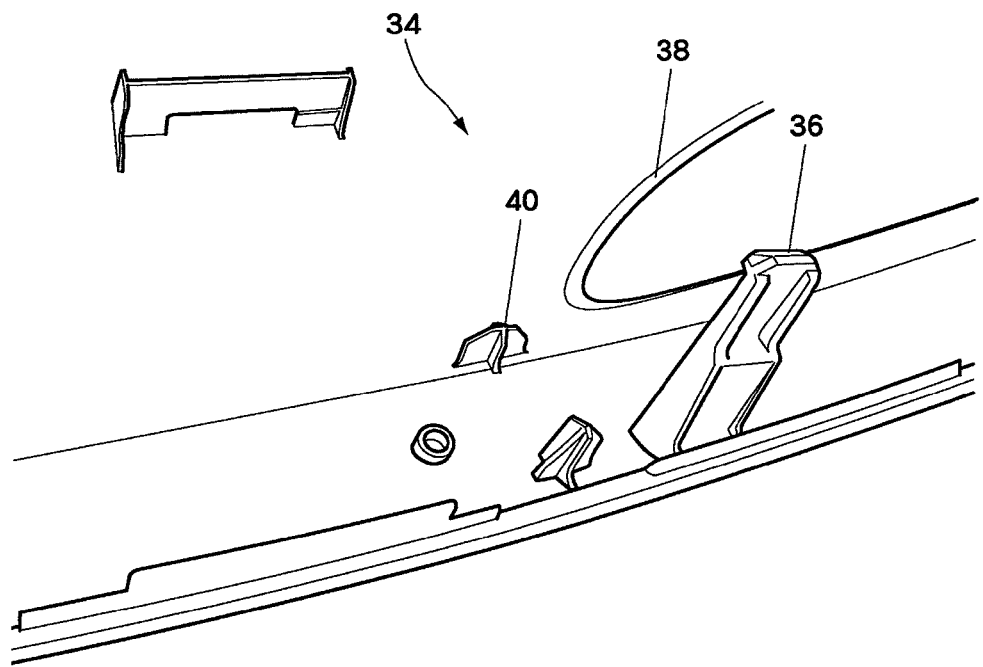
FIG. 7 is an enlarged perspective view of around the protrusion 40 on the back surface of the housing cover 34 in FIG. 6.

FIG. 6 shows a housing cover 34 viewed from a back side. On a back surface of the housing cover 34, a plurality of hooks 36 (engaging pawls) are formed that engage (are hooked on) predetermined engaging portions (hooking portions) on the mirror housing 10 or the frame 12 when the housing cover 34 is placed over the mirror housing 10 to mount the housing cover 34 to the mirror housing 10. In a different position on the back surface of the housing cover 34, a plurality of engaging portions (hooking portions) 37 are formed that engage (are hooked on) hooks (engaging pawls) formed on the mirror housing 10 when the housing cover 34 is placed over the mirror housing 10 to mount the housing cover 34 to the mirror housing 10. In the housing cover 34, a notch-like opening 38 is formed through which the lens 20 of the turn lamp assembly 16 is exposed to the outside when the housing cover 34 is placed over the mirror housing 10. On the back surface of the housing cover 34, a protrusion 40 constituted by a front cross-shaped rib is formed that is inserted into and engaged with the positioning hole 30a in the turn lamp assembly 16 when the housing cover 34 is placed over the mirror housing 10. The protrusion 40 is tapered.

Figure 8:
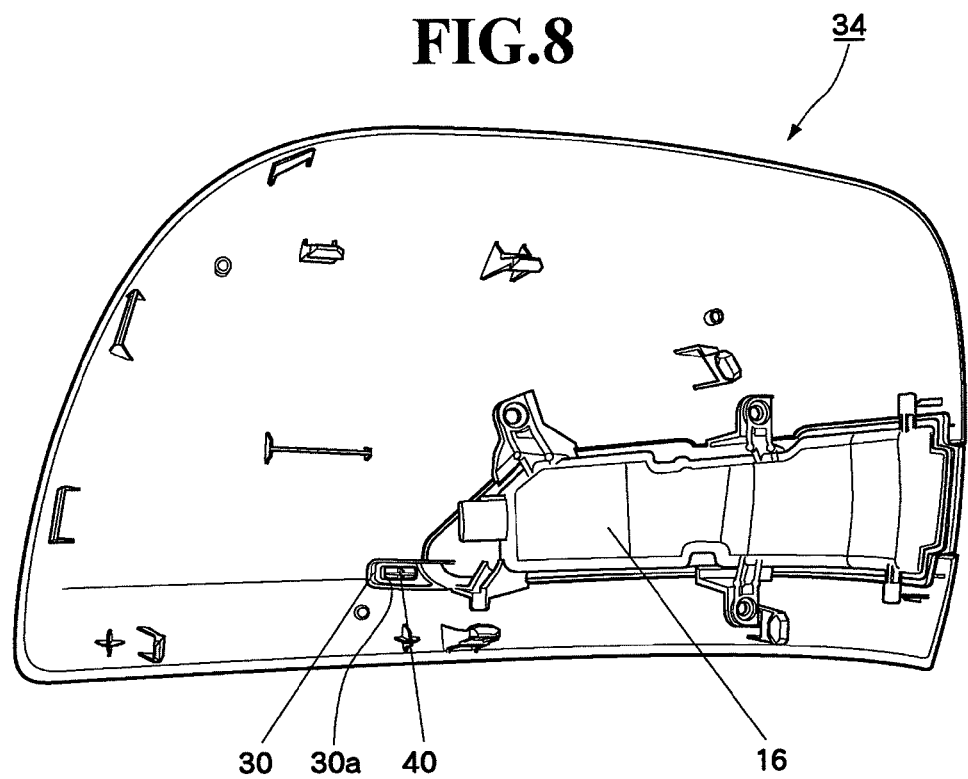
FIG. 8 shows a state where the turn lamp assembly 16 is placed alone in a predetermined position on a back surface of the housing cover 34.
Figure 9:
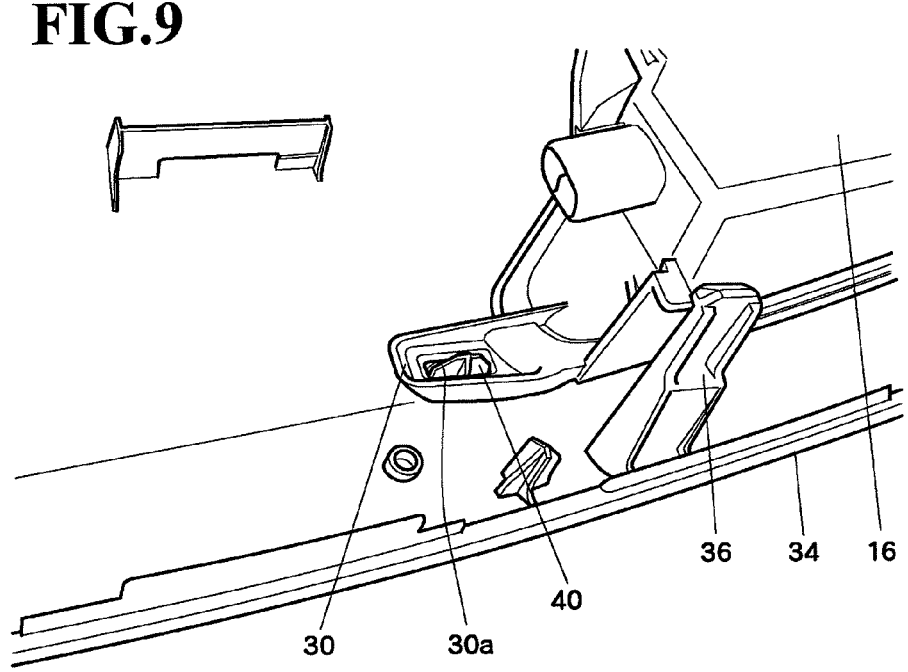
FIG. 9 is an enlarged perspective view of around the protrusion 40 on the back surface of the housing cover 34 in the state in FIG. 8.

FIG. 8 shows, for reference, a state where the turn lamp assembly 16 is placed alone (that is, without being mounted to the mirror housing 10 mounted with the frame 12 in FIG. 2) in a predetermined position (a position where the lens 20 is housed in a predetermined state in the opening 38 in the housing cover 34) on the back surface of the housing cover 34. FIG. 9 is an enlarged view of around the protrusion 40 at this time. The protrusion 40 is inserted into and engaged with the positioning hole 30a in the turn lamp assembly 16.

Figure 10:
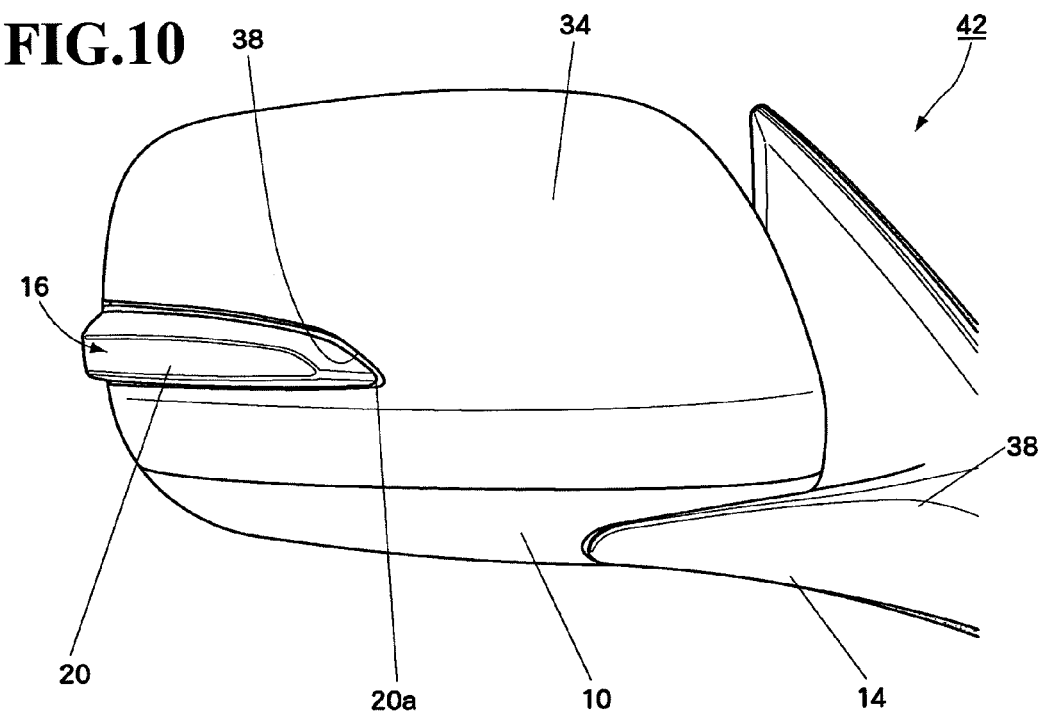
FIG. 10 is a back view of a door mirror 42 showing a state where the housing cover 34 in FIG. 6 is placed over and mounted to the mirror housing 10 mounted with the frame 12 and the turn lamp assembly 16 in FIG. 5 to assemble the door mirror 42.

FIG. 10 shows a state where the housing cover 34 in FIG. 6 is placed over and removably mounted to the mirror housing 10 mounted with the frame 12 and the turn lamp assembly 16 in FIG. 5 to assemble the door mirror 42. Engagement (fitting) between the front cross-shaped protrusion 40 and the rectangular positioning hole 30a allows the lens 20 of the turn lamp assembly 16 to be correctly housed in the opening 38 in the housing cover 34, and also allows the end 20a of the lens 20 on the side close to the vehicle body to be correctly placed in the opening 38 in the housing cover 34 without misalignment.

Figure 1A:
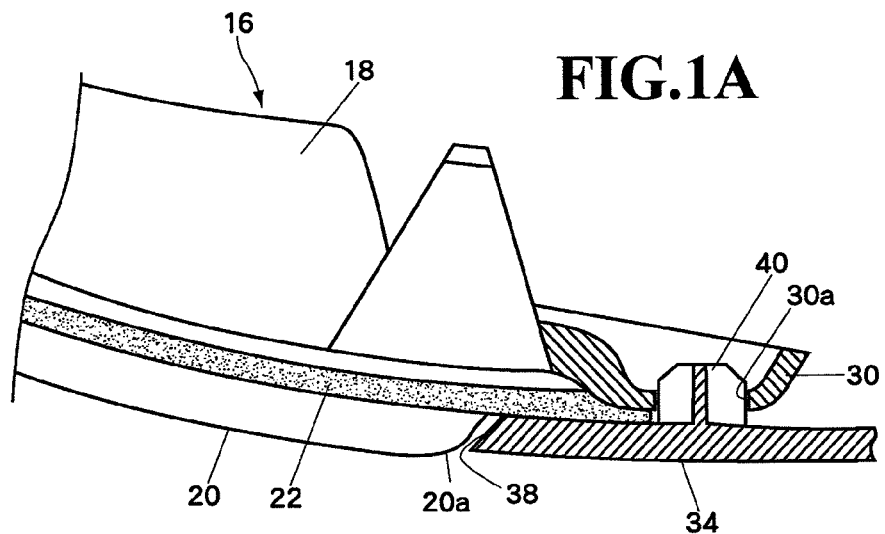
FIGS. 1A and 1B show an embodiment of the present invention, show an arrangement around a protrusion 40 in an assembled state of a door mirror in FIG. 10.
Figure 1B:
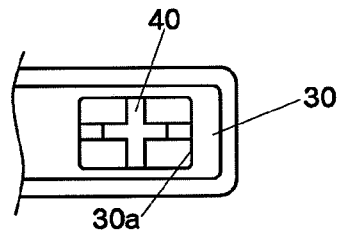

FIG. 1 shows an arrangement around the protrusion 40 in an assembled state of the door mirror in FIG. 10. FIG. 1A is a partial sectional view, and FIG. 1B is a front view showing an engagement state between the protrusion 40 and the positioning hole 30a. Engagement between the protrusion 40 and the positioning hole 30a allows the end 20a of the lens 20 of the turn lamp assembly 16 on the side close to the vehicle body to be positioned with respect to the opening 38 in the housing cover 34 both vertically and laterally without misalignment.

In the embodiment, the hole 30a is formed for positioning, but instead of the hole 30a, a recess may be formed. In the embodiment, the hole 30a is formed in the turn lamp assembly 16, and the protrusion 40 is formed on the housing cover 34, but to the contrary, a protrusion may be formed on the turn lamp assembly 16, and a hole or a recess may be formed in the housing cover 34. In the embodiment, the protrusion 40 is formed into the front cross shape, but may be formed into a shape other than the front cross shape. In the embodiment, the turn lamp assembly 16 is secured to both the frame 12 and the mirror housing 10 (secured to the boss 11 on the frame 12 and the bosses 13 and 15 on the mirror housing 10), but may be secured to only one of the frame 12 and the mirror housing 10.

What is claimed is:

1. A positioning structure of a turn lamp assembly in an outer mirror with turn lamp having a structure in which the turn lamp assembly is mounted to a mirror housing and a housing cover is positioned over and mounted to the mirror housing, and a lens of the turn lamp assembly is exposed through an opening in the housing cover, the positioning structure comprising:
    a protrusion or a recess provided in a peripheral edge of the opening in a back surface of the housing cover; and
    a recess or a protrusion that is provided in the turn lamp assembly and engages the protrusion or the recess of the housing cover when the housing cover is placed over the mirror housing to which the turn lamp assembly is mounted.

2. The positioning structure according to claim 1, wherein the recess or the protrusion of the turn lamp assembly is provided at a position closer to a vehicle body than a securing position of the turn lamp assembly to the mirror housing.

3. The positioning structure according to claim 2, wherein the recess or the protrusion of the turn lamp assembly is provided at a position closer to the vehicle body than an end of the lens of the turn lamp assembly exposed on the side close to the vehicle body.

4. The positioning structure according to claim 3, wherein the protrusion comprises a front cross-shaped rib, and the recess comprises a rectangular shape into which the rib fits.

5. The positioning structure according to claim 2, wherein the protrusion comprises a front cross-shaped rib, and the recess comprises a rectangular shape into which the rib fits.

6. The positioning structure according to claim 1, wherein the recess or the protrusion of the turn lamp assembly is provided at a position closer to a vehicle body than an end of the lens of the turn lamp assembly exposed on the side close to the vehicle body.

7. The positioning structure according to claim 6, wherein the protrusion comprises a front cross-shaped rib, and the recess comprises a rectangular shape into which the rib fits.

8. The positioning structure according to claim 1, wherein the protrusion comprises a front cross-shaped rib, and the recess comprises a rectangular shape into which the rib fits.

9. The positioning structure according to claim 1, wherein the mirror housing comprises a frame mounted to the mirror housing.

10. The positioning structure according to claim 1, wherein the mirror housing comprises a frame as part of the mirror housing.

11. The positioning structure according to claim 1, wherein the recess comprises a hole.

12. The positioning structure according to claim 1, wherein the turn lamp assembly includes a plurality of flanges, at least one of the flanges including an aperture configured to receive a securing member to secure the turn lamp assembly to the mirror housing and another one of the flanges includes the protrusion or the recess.

13. The positioning structure according to claim 1, the recess or protrusion provided in the turn lamp assembly is provided in a flange that extends outwardly from a body of the turn lamp assembly.

14. The positioning structure according to claim 1, the turn lamp assembly being configured to fit within the opening of the housing cover.

15. The positioning structure according to claim 1, a cross sectional shape of the protrusion or recess of the housing cover being configured to be guidingly engaged with the recess or protrusion of the turn lamp assembly.

16. The positioning structure according to claim 1, wherein the recess or the protrusion of the turn lamp assembly is provided at a position closer to the vehicle body than a mounting position of the turn lens assembly to the mirror housing.

* * * * *